United States Patent [19]
Owen

[11] Patent Number: 5,497,266
[45] Date of Patent: Mar. 5, 1996

[54] TELESCOPIC DAY AND NIGHT SIGHT

[75] Inventor: Larry D. Owen, Phoenix, Ariz.

[73] Assignee: Litton Systems, Inc., Woodland Hills, Calif.

[21] Appl. No.: 281,440

[22] Filed: Jul. 27, 1994

[51] Int. Cl.$^6$ .............................. G02B 5/08; H04N 5/33
[52] U.S. Cl. .................... 359/353; 359/350; 359/351; 348/164
[58] Field of Search ............................ 359/15, 27, 350, 359/351, 353, 356, 357, 505; 348/164

[56]  References Cited

U.S. PATENT DOCUMENTS

| | | | |
|---|---|---|---|
| 3,598,467 | 8/1971 | Pearson | 359/27 |
| 4,199,220 | 4/1980 | Casagrande | 359/505 |
| 4,751,571 | 6/1988 | Lillquist | 348/164 |
| 5,035,472 | 7/1991 | Hansen | 359/350 |
| 5,084,780 | 1/1992 | Phillips | 359/350 |
| 5,161,051 | 11/1992 | Whitney et al. | 359/351 |
| 5,365,354 | 11/1994 | Jannson et al. | 359/15 |

*Primary Examiner*—Paul M. Dzierzynski
*Assistant Examiner*—Audrey Y. Chang
*Attorney, Agent, or Firm*—Poms, Smith, Lande & Rose

[57]  ABSTRACT

A day/night sight includes a visible-light first optical path and an invisible-light second optical path which are everywhere optically coaxial. The invisible-light second optical path leads to a detector or to an image intensifier tube for providing either an electrical signal or a visible image, respectively, in response to the invisible-light image. A third optical path for the visible image from the image intensifier tube is also everywhere optically coaxial with the first and second optical paths. A visible image produced from the electrical signal is introduced into the first optical path to thereafter be coaxial therewith. Consequently, a uniquely compact arrangement of the elements for the day/night sight is achieved.

29 Claims, 3 Drawing Sheets

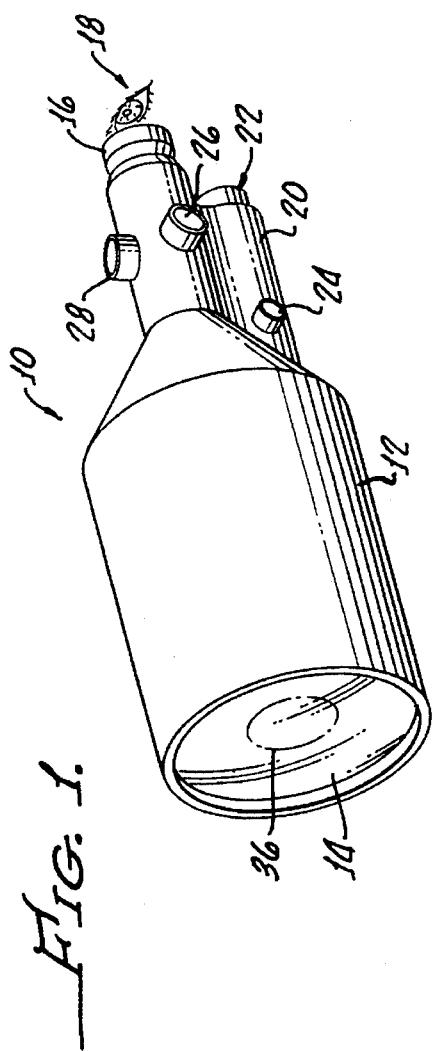
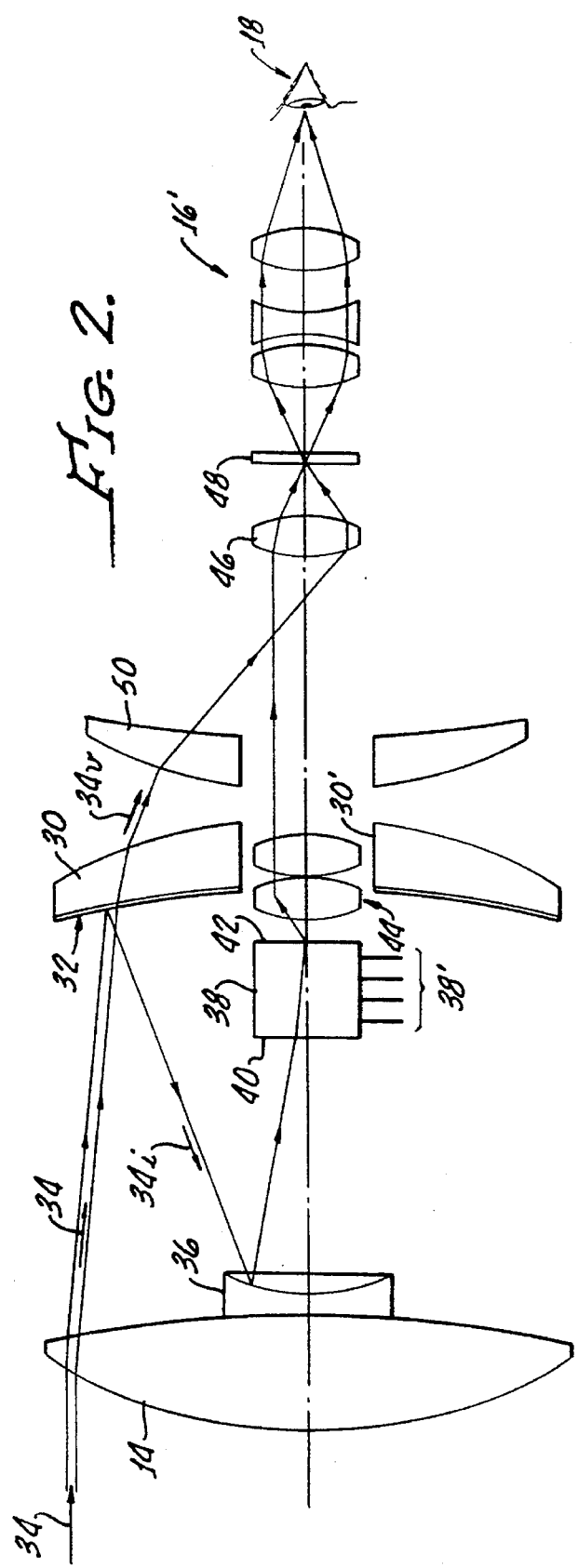

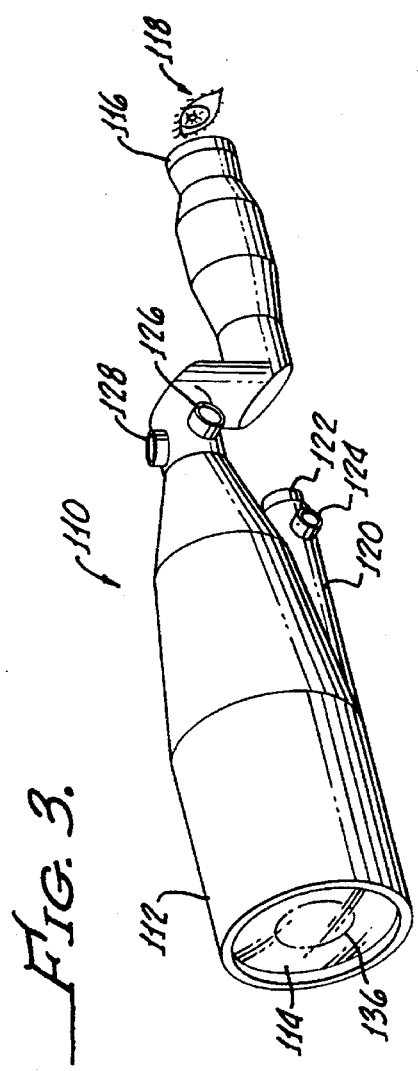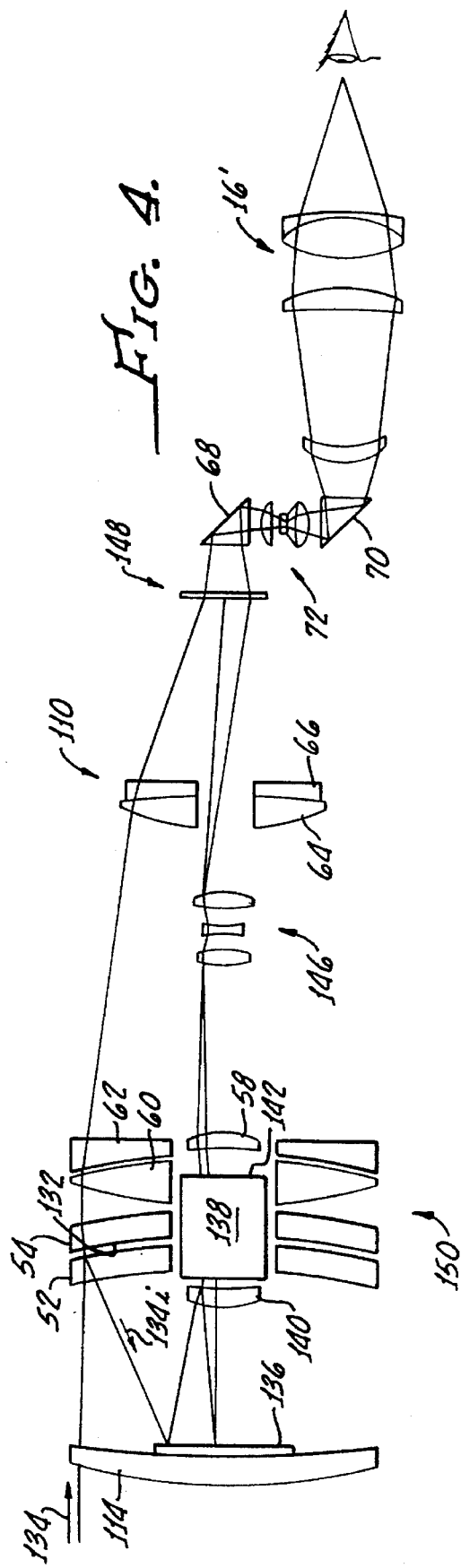

TELESCOPIC DAY AND NIGHT SIGHT

BACKGROUND OF THE INVENTION

1. Field of the Invention

The present invention is in the field of telescopes which can be used both in the day time to obtain a magnified view of a distant scene, and which can also be used at night or under other low-light conditions to obtain a view of the distant scene which is both magnified and intensified or amplified to provide a visible image of a scene too dark to be viewed with natural vision. The present invention also relates to such telescopes which are equipped with a reticle for use in sighting a weapon in both day-light and low-light conditions.

2. Related Technology

A conventional day/night telescopic sight is known in accord with U.S. Pat. No. 5,084,780, issued Jan. 18, 1992 to E. A. Phillips. The Phillips patent appears to teach a telescopic day/night sight which has several alternative embodiments. According to one embodiment set out in the Phillips patent, such a telescopic sight includes an objective lens behind which is disposed an angulated dichroic mirror. This mirror divides light coming into the sight via the objective lens into two frequency bands. Light of longer wavelengths (lower frequencies) is allowed to pass through the dichroic mirror to an image intensifier tube. This image intensifier tube operates in the conventional way familiar to those ordinarily knowledgeable about night vision devices. That is, the image intensifier tube provides a visible image which replicates a dim image or an image formed by invisible infrared light. Thus, the longer wavelength band which passed through the dichroic mirror includes the infrared portion of the spectrum, and provides to the image intensifier tube the frequencies of light to which the tube is most responsive. The visible portion of the light entering the sight via the objective lens is reflected by the dichroic mirror into an optical system leading to a combiner and to an eyepiece. At the combiner, the image provided by the image intensifier tube is superimposed on the image from the visible-light channel of the sight, and the resulting combined image is presented to a user of the sight via the eyepiece.

A possible disadvantage of the Phillips sight as described above is that the angulated dichroic mirror can introduce both parallax, astigmatism, and color aberrations into the image provided to the user. Thus, slight movements of the sight may cause the user to experience some shifting of the image along a line parallel with the angulation of the mirror, while the image does not shift along a line perpendicular to this angulation. In other words such an angulated dichroic mirror may result it the slight jiggling inherent in a hang-held telescope or weapon sight amplifying the apparent movement of the image in at least one direction. This effect can be disconcerting for the user of the device.

Other versions of the Phillips sight use a separate objective lens for both the day channel and the night channel of the sight. These versions would not appear to suffer from the same possible parallax problem described above with respect to the versions using the dichroic mirror. However, the versions of Phillips sight with two objective lenses suffer from an increased size, weight, and expense because of the additional optics and larger housing required to mount and protect these optics.

In each case with the sight of Phillips, the optical channels for the night sight and the day sight are laterally offset relative to one another. These two offset optical channels are parallel, and the image from these channels is combined for presentation at the eyepiece. However, in each case, the sight taught by Phillips requires separate laterally offset optical channels, and presents the problem of correctly and precisely superimposing the image from these two channels for the user of the sight.

SUMMARY OF THE INVENTION

In view of the deficiencies of the conventional day/night sights, it is an object for this invention to avoid one or more of these deficiencies.

Further to the above, it is an object for this invention to provide a day/night telescopic sight which has a day channel and a night channel which are everywhere coaxial.

An additional object for this invention is to provide such a day/night telescopic sight which provides for the use of a sensor other than an image intensifier tube for the longer wavelengths of light, such as the infrared wavelengths.

Still further to the above, such a sight according to an object of this invention is provided with an image source such as a liquid crystal display, which provides an image for combination with a day channel image of the sight.

Additionally, an object for this invention is to provide such a sight having a long wavelength sensor other than an image intensifier tube, and a day channel with a separate objective lens so that the day channel does not suffer color aberrations which might result from a dichroic mirror or lens.

Accordingly, the present invention provides a telescopic day/night sight including an objective lens through which light from a scene to be viewed is received under both day-time and night-time (or other low-light) conditions, a dichroic element aft of the objective lens and dividing the received light into a visible-light frequency band and an infrared invisible-light frequency band, a first optical path extending from the dichroic element to an eyepiece for providing a visible-light image of the scene to a user of the sight, a second optical path optically coaxial with the first optical path and extending from the dichroic element to means for receiving the invisible light and providing in response thereto a visible image replicating the scene, a third optical path optically coaxial with the first optical path and extending from the means for receiving the invisible light and providing a visible image in response thereto to provide the visible image from the means to the eyepiece superimposed with the visible-light image and via the eyepiece to a user of the sight.

According to another aspect, the present invention provides a telescopic day/night sight including a single objective lens through which light from a scene to be viewed is received, a dual-function dichroic lens/mirror element aft of the objective lens and both dividing the received light into a visible-light frequency band and an infrared invisible-light frequency band, as well as refracting one of the frequency bands of light, a first optical path extending from the dichroic element to an eyepiece for providing a visible-light image of the scene to a user of the sight, a second optical path extending from the dichroic element to the eyepiece for providing a visible image replicating the scene in response to the infrared invisible-light frequency band, the second optical path including means for receiving the invisible light and providing in response thereto a visible image replicating the scene.

Still additionally, the present invention provides according to another aspect a hybrid electro-optical telescopic day/night sight comprising a single objective lens through which light from a scene to be viewed is received, a dual-function dichroic lens/mirror element aft of the objective lens and both dividing the received light into a visible-light frequency band and an infrared invisible-light frequency band, as well as refracting one of the frequency bands of light, a first visible-light optical path extending from the dichroic element to an eyepiece for providing a visible-light image of the scene to a user of the sight, a second invisible-light hybrid electro-optical path extending from the dichroic element to the eyepiece for providing a visible image replicating the scene in response to receipt of the infrared invisible-light frequency band, the second optical path including electro-optical means for receiving the invisible infrared light and providing in response thereto an electronic image signal, image signal processing means for receiving the electronic image signal and selectively adding indicia thereto including an aiming reticle for the sight to provide a processed electronic image signal, and means for providing a visible image replicating the scene and including the added indicia in response to the processed electronic image signal.

Additional objects and advantages of the present invention will be apparent from a reading of the following detailed description of several alternative preferred exemplary embodiments of the invention, taken in conjunction with the appended drawing Figures.

BRIEF DESCRIPTION OF THE DRAWING FIGURES

FIG. 1 provides an exterior view of a telescopic day/night sight embodying the present invention;

FIG. 2 provides a diagrammatic representation of the internal optical structure of the sight seen in the. preceding drawing Figure;

FIG. 3 provides an exterior view of an alternative telescopic day/night sight embodying the present invention;

FIG. 4 provides a diagrammatic representation of the internal optical structure of the sight seen in the preceding drawing Figure;

FIG. 5 provides an exterior view of still another alternative telescopic day/night sight embodying the present invention; and FIG. 6 provides a diagrammatic representation of the internal optical structure of the sight seen in the preceding drawing Figure.

DETAILED DESCRIPTION OF THE PREFERRED EXEMPLARY EMBODIMENTS OF THE INVENTION

Figure 5:
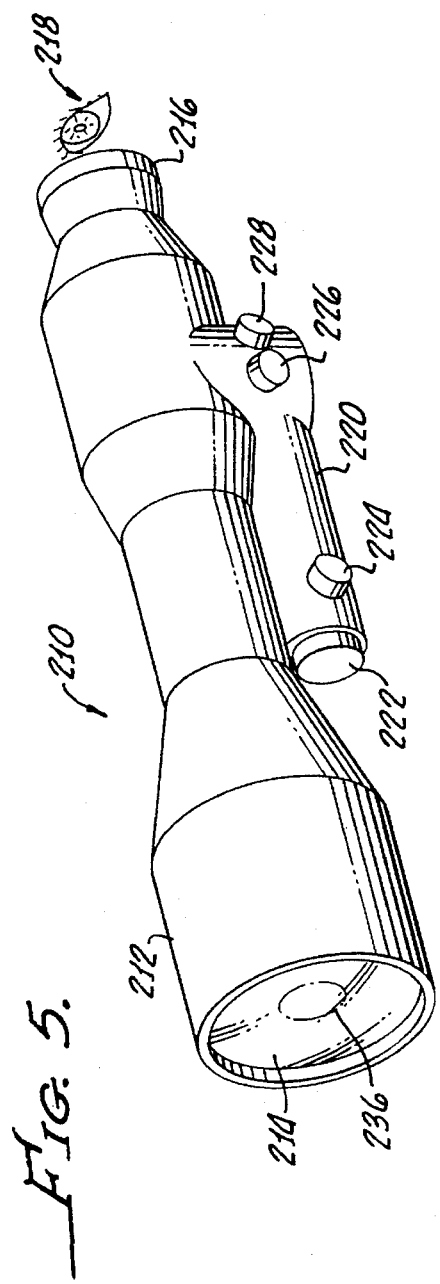

Viewing FIG. 1, a telescopic day/night sight 10 includes a housing 12 of stepped outer diameter, and which at a forward end includes an objective lens 14. The term "forward" as used herein has reference to the direction toward an object or scene to be viewed by use of the telescopic sight, while the terms "rear" or "rearward" refer to the opposite direction toward a user of the sight. At its rear end, the housing 12 includes an eyepiece 16 into which the user 18 peers to obtain a magnified telescopic view of the object or scene toward which the sight 10 is directed. The housing 12 also provides a battery housing portion 20 having a removable cap 22 allowing replacement of a battery (not shown) housed in the portion 20. A power switch 24 allows the user 18 to turn on and off a night vision facility of the sight 10, as will be further described. Along the body 12 are located a pair of adjustment screw housings 26 and 28, each also having a removable cap portion beneath which is located a respective elevation and azimuth adjustment screw (not visible in the drawing Figures) for an aiming reticle of the sight 10, as also will be further explained. The sight 10 may be mounted to a weapon (not shown) so that the sight 10 is used in directing the weapon at a target viewed through the sight. Alternatively, sight 10 may be mounted on a tripod for surveillance use, for example.

Viewing now FIG. 2, it is seen that the sight 10 includes objective lens 14, behind which is located an annular dual-purpose modified Magnin-type of lens/mirror 30. The lens/mirror 30 includes a concave forward surface upon which is carried a dichroic reflective filter coating 32. This dichroic filter coating 32 is essentially transparent to visible light, and is essentially reflective to invisible light in the infrared and near infrared wavelengths. Accordingly, light from an object of scene to be viewed by use of the sight 10, which is represented by arrows 34 on FIG. 2, is directed by objective lens 14 to the mirror lens 30. The dichroic filter coating 32 divides this light into two frequency bands, one including the shorter visible wavelengths and the other including the longer invisible infrared wavelengths.

As is seen on FIG. 2, the invisible wavelengths of light, indicated with arrow $34_i$ reflect from the coating 32 to a secondary mirror 36, which is centrally disposed on or adjacent to the rear surface of the objective lens 14. So far as the invisible light $34_i$ is concerned, the lens/mirror 30 serves as a concentrating concave mirror. The secondary mirror 36 is configured to correct astigmatism and flatten the visual field of light reflected from this mirror to an image intensifier tube 38. The image intensifier tube 38 is located within the central aperture 30' of the lens/mirror 30. This image intensifier tube 38 includes an entrance window 40 through which infrared light may be received. When the intensifier tube 38 is provided with electrical power via conductors indicated with the numeral 38', the tube provides at an image window 42 an intensified visible image replicating the image carried by the invisible infrared light (i.e., by the light represented with arrows $34_i$).

Those ordinarily skilled in the night vision art will recognize that the image intensifier tube 38 is supplied with electrical power of appropriate voltage and current levels by a power supply circuit (not shown) drawing its electrical power from a battery stowed in the battery housing portion 20, and under control of the on/off switch 24. Accordingly, under night-time or other conditions of low lighting level, the user 18 turns on the night vision portion of the sight 10 which is provided with the image intensifier tube 38 to obtain an intensified visible image of an invisible night time or dimly illuminated scene. The image provided at image window 42 of the image intensifier tube 38 is transmitted via a pair of field lenses 44 to an invertor lens 46. From the invertor lens 46, this intensified image is projected onto a reticle/diffuser 48. As will be explained, the user 18 can view the image on reticle/diffuser 48 via the eyepiece lenses, indicated on FIG. 2 with the numeral 16'.

However, during day time or other conditions of adequate illumination, the user 18 may view a visible light image through the sight 10. That is, viewing FIG. 2, the visible light passing through lens/mirror 30 (as is indicated with arrows $34_v$) passes to an annular second lens element 50. With respect to this visible light $34_v$, the lens/mirror 30 serves as a concave-convex magnifying lens, which concentrates the visible light toward the second lens element 50. This second lens element 50 projects the visible light $34_v$ to the same invertor lens 46 described above. As before, the invertor lens 46 projects this light to the reticle/diffuser 48. This reticle/diffuser 48 provides the dual functions of providing an aiming reticle (such as a cross hairs) for use in aiming a weapon with the sight 10, and eliminates a central obscuration or dark spot resulting from the central secondary reflector and the annular configuration of the elements 30, 50. That is, it is apparent that the optical system depicted in FIG. 2 manipulates an annulus of light received via lens 14 around the perimeter of secondary reflector 36. This annulus of light contains a complete image of the distant scene to be viewed through the sight 10, but provides the possibility that the user may position the eye so that the dark spot is visible.

Preferably, the sight 10 provides an entrance pupil at objective lens 14 of 100 mm. diameter, and a magnification of 7 powers. This combination will provide an exit pupil at eyepiece 16 of about 14 mm. Of this 14 mm. exit pupil, a central 40 to 50 percent of the diameter may be dark. In other words, the secondary reflector 36 has a diameter of 40 to 50 mm., and blocks the corresponding proportionate area of the exit pupil as well. In all locations within the exit pupil of the sight 10 and outside of this central obscuration or dark spot, the light delivered to an eye contains the entire image. An eye placed in this annular area will receive the full view of the scene being observed. However, under various lighting conditions, the human eye has a pupil diameter of from about 2.5 mm. to about 7 mm., with an average diameter of about 5 mm. Thus, dependent upon ambient lighting conditions, the user 18 might place the pupil of the eye directly in the central obscuration or dark spot, and see no image. Accordingly, the reticle/diffuser serves somewhat as a rear projection screen to average the light over the plane of this reticle/diffuser, and substantially eliminate the central obscuration or dark spot.

The applicant believes that either one of two alternative optical elements will function satisfactorily for use as the reticle/diffuser element. The first of these elements is a thin plate formed as a coherent bundle of optical fibers. This optical fiber bundle serves to provide a relatively thin transparent plate-like structure having a great multitude of fine-dimension optical glass fibers which are mutually interbonded and which extend between the opposite faces of the plate. Each of the optical fibers outside of the central obscuration receives at its forward end light from the scene viewed with the sight 10. At its aft end, each of the illuminated optical fibers provides an end from which the light radiates in a cone, effectively filling in the central obscuration with light carrying the entire image. The reticle pattern can be etched directly on this thin transparent optical fiber glass plate. An actual test of this type of reticle/diffuser in test apparatus closely replicating the optical system of the sight 10 so far as the dark spot and reticle/diffuser is concerned provided essentially complete uniformity of image availability across the entire exit pupil of the test apparatus.

Alternatively, the applicant has determined that a holographic diffuser could be used to form the reticle/diffuser 48. Such holographic diffusers provide a light diffusion angle which can be tailored across the dimension of the diffuser so that filling in of the central obscuration is most effective and causes the least diminution or loss of brightness of the image in other areas of the exit pupil of the sight 10. For example, with a holographic diffuser, light from the periphery of the image may be used to fill in the dark spot so that the periphery of the image becomes somewhat dimmer, but the important central area of the viewed scene remains its greatest possible brightness. As with the optical fiber reticle/diffuser, the holographic diffuser may be provided directly with the desired reticle pattern. Alternatively, a separate reticle plate may be used along with either the fiber optic diffuser or the holographic diffuser to provide the desired reticle pattern in the sight 10.

Considering further FIGS. 1 and 2, it is seen that the visible-light image and the visible image provided from the image intensifier tube 38 are superimposed with one another at the reticle/diffuser 48. Accordingly, the user 18 may use the sight in day time to see a visible light image, at night time to see a visible image provided by the image intensifier tube 38, and under dawn or dusk conditions, for example, when both a dim visible-light image and the visible image produced by the image intensifier tube 38 are presented together and superimposed for viewing by the user. Also, it will be appreciated that the sight 10 is optically everywhere coaxial. That is, the visible light which will form the visible-light image and the invisible light which will be directed to the image intensifier tube 38 are everywhere coaxial. Further, the visible image from the image intensifier tube 38 is also everywhere coaxial with the visible light path of the sight so that a compact arrangement of the elements for the sight is obtained.

FIGS. 3 and 4 provide exterior and diagrammatic views similar to FIGS. 1 and 2, but showing a more detailed alternative embodiment of the present telescopic day/night sight. In order to obtain reference numerals for use in describing the structure seen in FIGS. 3 and 4, features which are analogous in structure or function to those introduced above are referenced with the same numerals used above and increased by 100. Viewing now FIGS. 3 and 4 in conjunction with one another, it is seen that the sight telescopic day/night sight 110 of FIG. 3 similarly includes a housing 112 of stepped outer diameter. The housing 112, is "cranked", or off set between its forward and aft end so that the eyepiece 116 is not coaxial with the objective lens 114. The housing 112 includes a battery housing portion 120 having a removable cap 122, and a power switch 124 allowing the user 118 to turn on and off the night vision facility of the sight 110. Housing 112 also includes a pair of adjustment screw housings 126 and 128, for respective elevation and azimuth adjustment screws.

Viewing now FIG. 4, it is seen that the lens mirror element 130 includes a pair of annular optical lens elements 52 and 54. The first of these lens elements (element 52) is a concave-convex lens having its forward concave surface disposed toward the objective lens 114. The second lens element 54 is similar to a Mangin reflector element, and carries the reflective filter coating 132 on its forward concave surface. Because of the positioning of the first lens element 52 in front of the reflective filter coating 132, light in the longer wavelength frequency band (i.e., the invisible infrared light) benefits from two refractive passages through the element 52. That is, the longer infrared light admitted via objective lens 114 passes first rearwardly through the lens element 52 to the filter coating 132 on the forward surface of lens element 54 where it is reflected. This reflected infrared light passes again through the lens element 52 on its way to the secondary reflector 136.

In this embodiment of the invention, in part because of the dual refractive effect obtained from the first lens element 52, the secondary reflector 136 is much less concave than was required by the first embodiment of the invention set forth in FIGS. 1 and 2. The secondary reflector 136 is nearly flat, with some aplanarity for purposes of correcting astigmatism and flattening the visual field of the image provided to the image intensifier tube 138. An additional simple meniscus lens element 56 at the entrance window 140 of the intensifier tube 138 serves to further correct residual astigmatism and flatten the image field. A concave-convex lens element 58 disposed behind the image window 142 of the image tube 138 serves to project the intensified image from this tube to a set of invertor lenses, generally referenced with the numeral 146. In this case, the invertor lenses 146 are a triplet set of lenses similar to a Cooke triplet invertor. The lenses 146 project the intensified image from image tube 138 to a reticle/diffuser 148.

As was the case also with the lens/mirror 30 of the first embodiment of the invention described above, the lens/ mirror 130 includes a refractive lens element. The second lens element 54, which at its forward surface carries the reflective filter coating 132, serves to also refract the visible light frequency band passing through the coating 132 and also through this lens element 54. Behind the lens element 54, the second lens element 150 is composed of a pair of lenses 60 and 62. An additional set of annular field lenses 64 and 66 are located rearwardly of the lenses 60 and 62 in order to project the visible light image onto the reticle/ diffuser 148. It will be recognized that the objective lens system described for this embodiment is similar to a Petzval objective design, with the added feature that the lenses are all annular. The annular lenses of the present telescopic sight are seen to accommodate the image intensifier tube 38 (or 138) in a desirable location for purposes of receiving and amplifying light in the invisible infrared frequency band. At the reticle/diffuser 148, either the visible light image, the intensified image from the image intensifier tube 138, or both superimposed together, is visible to the user via eyepiece 116'.

However, the embodiment of FIGS. 3 and 4 is seen to also include a pair of folding mirrors or prisms 68 and 70 for the purpose of moving the eyepiece 116 off axis with respect to the large objective lens 114. An advantage of having the eyepiece 116 offset with respect to the objective lens is recognized to reside in the possibility of placing the eyepiece 116 closer to the sighting line established by the conventional "iron sights" of a weapon such as a rifle. Thus, the user of the rifle upon which the sight 110 is mounted with be able to use the sight 10 with a hold on the weapon the same as or similar to that to which the user is accustomed. It will be noted that the image provided by the visible light portions of the sight 10 form an inverted image at reticle/ diffuser 148. Thus, an invertor Cooke triplet lens set 72 is provided to re-invert the image and provide an erect image to the user 118 via the eyepiece lenses 116'. Also, it should be noted that the offset of the optical pathway of the sight 130 (i.e., the "cranking" of the housing 112), does not alter the coaxial nature of the sight. That is, the optical pathways remain everywhere coaxial. The offset of the optical pathway at reflectors 66, 68 to allow eyepiece 116 to be offset relative to the objective lens 114 is after the reticle/diffuser where the visible-light image and the visible image produced from the invisible infrared light are superimposed on one another and are coaxial. Accordingly the advantages of a compact arrangement for the sight 110 is preserved.

Figure 6:
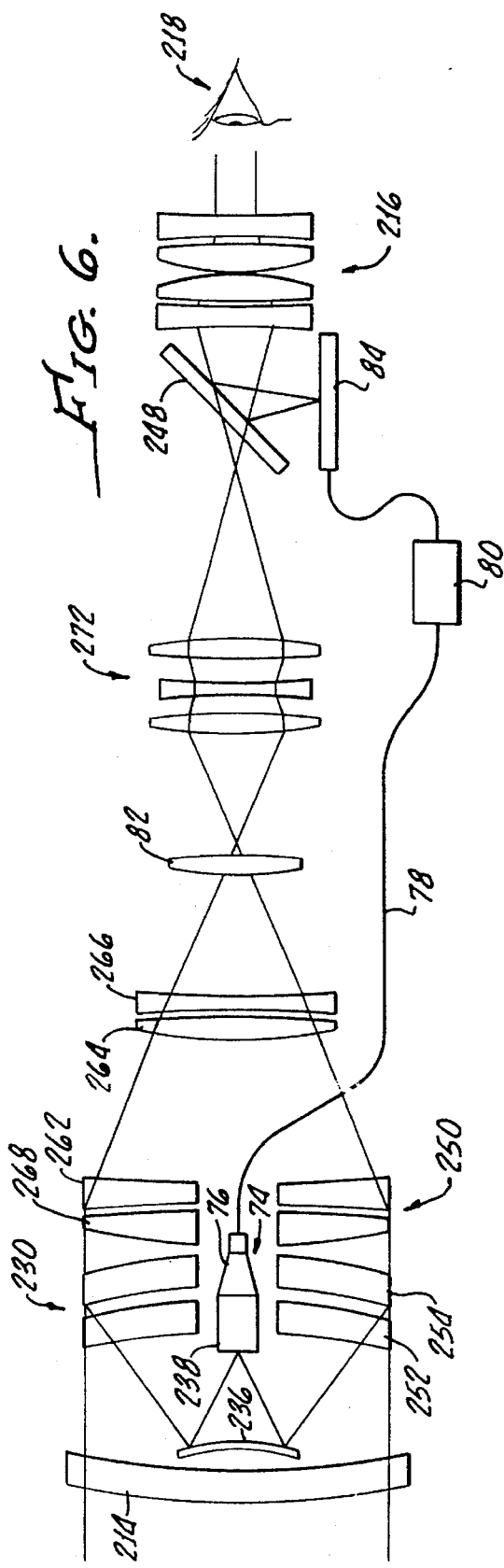

FIGS. 5 and 6 present yet another alternative embodiment of the invention, in which the image in the invisible frequency band (i.e., in the infrared wavelengths) is converted by a sensor into an electrical signal (either with or without frequency shifting and amplification as are provided by an image intensifier tube), is electronically manipulated to provide a reticle as well as other desired indicia on the image, and is then reconverted back to a visible image by a display device such as a liquid crystal display (LCD) screen.

In order to obtain reference numerals for use in describing the structure seen in FIGS. 5 and 6, features which are analogous in structure or function to those introduced above are referenced with the same numerals first used above and increased by 200. Viewing more particularly FIGS. 5 and 6 in conjunction with one another, it is seen that the sight telescopic day/night sight 210 of FIG. 5 includes a housing 212 of stepped outer diameter. The housing 212 carries a forward objective lens 214, and includes a battery housing portion 220 having a removable cap 222. A power switch 224 allows the user 218 to turn on and off the night vision facility of the sight 210. Housing 212 also includes a pair of adjustment screw housings 226 and 228 with removable cap portions for protecting respective elevation and azimuth adjustment screws.

FIG. 6 shows that the sight 210 includes a lens/mirror element 230 including a pair of annular optical lens elements 252 and 254. The first of these lens elements (element 252) is a concave-convex lens having its forward concave surface disposed toward the objective lens 214. The second lens element 254 is similar to the lens element 54 introduced above, and is similarly a dual-function optical element in the sight 210. The lens element 254 carries the reflective filter coating 232 on its forward concave surface. Because of the positioning of the first lens element 252 in front of the reflective filter coating 232, light in the invisible infrared wavelength frequency band makes two refractive passages through the element 252. The secondary reflector 236 is again nearly flat, with some aplanarity for purposes of correcting astigmatism and flattening the visual field of the image provided to an image detector 74. The image detector 74 may include an image intensifier tube 238. However, disposed at the image window of the intensifier tube 238 is a charge coupled device (CCD) 76. This CCD is similar to the image detector in a video camera so that the visible image provided by the image intensifier tube 238 is converted to an electrical signal by the CCD 76. An electrical cable 78 connects to the CCD 76, and carries the electrical image signal from this CCD to an image signal processing circuit, schematically depicted and indicated with the numeral 80. Alternatively, the image detector 74 may include a cooled or uncooled infrared detector for converting the infrared light energy delivered by the optical elements depicted and described directly to an electrical signal. In this case also, the cable 78 would be used to carry the electrical image signal to the processing circuit 80.

As was the case also with the lens/mirror 30 and 130 of the embodiments described above, the lens/mirror 230 performs a dual function by including a refractive lens element. The second lens element 254, which at its forward surface carries the reflective filter coating 232, serves to also refract the visible light frequency band passing through the coating 232 and also through this lens element 254. Again, behind the lens element 254, the second lens element 250 is composed of a pair of lenses 260 and 262. An additional set of annular field lenses 264 and 266 are located rearwardly of the lenses 260 and 262 in order to project the visible light image onto the reticle/diffuser 248. However, it will be noted that in this embodiment of the invention, the lenses 260 and 262 need not be and are not annular. The lens elements 260 and 262 are full circular lenses. Between the lens 262 and the invertor triplet lenses 272 is disposed a field lens 82. This field lens 82 relays the light in the visible light frequency band to the invertor triplet 272. This invertor triplet 272 provides an erect image on an angulated reticle diffuser screen 248.

The reticle diffuser 248 differs from the prior reticle diffusers 48 and 148 in that it does not itself include a reticle pattern. With the present embodiment of the sight 10, 110, 210, the reticle pattern is presented electronically by the image processing circuit 80. That is, the video image signal from the detector 74, processed as desired in the circuit 80, perhaps to make edge transitions more distinct and to sharpen contrast in the image, is passed to a display screen 84, such as a back-lighted liquid crystal display (LCD) screen. Alternatively, the display screen 84 may include a cathode ray tube, a electro-luminescent display, or any of a variety of light-emitting displays. The display screen 84 provides a visible image of the scene imaged at detector 74 in invisible infrared light, along with any desired reticle pattern or other indicia which may be desired. This image is projected to the user 218 via the eyepiece lenses 216' by reflection from the angulated surface of the plate-like diffuser 248 which confronts both the eyepiece lenses and the display 84. In this case, the diffuser 248 also serves as a mirror to allow the user 218 to view the image provided by display 84.

The surface of diffuser 84 which provides the reflection of the visible image from display screen 84 may be provided with a dichroic coating selectively reflecting the frequency band of light provided by the display 84. Consequently, the reflectance of the diffuser 284 will be increased at this light frequency and decreased at other frequencies so that the diffuser 284 does not substantially interfere with viewing of the full-color visible-light image provided at the diffuser 284.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A telescopic day/night sight comprising:
   an objective lens through which light from a scene to be viewed is received under both day-time and night-time or other low-light conditions;
   a dichroic element aft of said objective lens and dividing the received light into a visible-light frequency band and an infrared invisible-light frequency band;
   a first optical path extending from said dichroic element to an eyepiece for providing a visible-light image of the scene to a user of said sight;
   a second optical path optically coaxial with said first optical path and extending from said dichroic element to means for receiving the invisible light and providing in response thereto a visible image replicating the scene;
   a third optical path optically coaxial with said first optical path and extending from said means for receiving the invisible light and providing a visible image in response thereto to provide the visible image from said means to said eyepiece superimposed with the visible-light image and via said eyepiece to a user of said sight.

2. The telescopic day/night sight of claim 1 wherein said means for receiving the invisible infrared light and providing a visible image replicating the scene includes an image intensifier tube.

3. The telescopic day/night sight of claim 1 wherein said means for receiving the invisible infrared light and providing a visible image replicating the scene includes an image intensifier tube, and a video charge coupled device (CCD) receiving the visible image provided by the image intensifier tube and providing an electrical video image signal in response thereto.

4. The telescopic day/night sight of claim 3 wherein said means for receiving the invisible infrared light and providing a visible image replicating the scene further includes a display device receiving the electrical video image signal and providing a visible image in response thereto.

5. The telescopic day/night sight of claim 4 wherein said means for receiving the invisible infrared light and providing a visible image replicating the scene further includes an angulated reflector disposed in said first optical path and reflecting the visible image from said display device toward said eyepiece coaxially with the visible-light image.

6. The telescopic day/night sight of claim 1 wherein said means for receiving the invisible infrared light and providing a visible image replicating the scene includes an infrared detector providing an electrical image signal in response to the infrared light, and a display device providing the visible image in response to the electrical image signal.

7. The telescopic day/night sight of claim 6 wherein said means for receiving the invisible infrared light and providing a visible image replicating the scene further includes an angulated reflector disposed in said first optical path and reflecting the visible image from said display device toward said eyepiece coaxially with the visible-light image.

8. The telescopic day/night sight of claim 1 wherein said dichroic element includes a dual-function lens/mirror which refracts one of said visible-light frequency band and said infrared invisible-light frequency band, and reflects the other of said visible-light frequency band and said infrared invisible-light frequency band.

9. The telescopic day/night sight of claim 8 wherein said dual-function lens/mirror includes a refractive lens element transparent to and refractive of one of the visible-light frequency band and the infrared invisible-light frequency band and having a surface carrying a dichroic coating which divides the received light into the visible-light frequency band and the infrared invisible-light frequency band by reflecting one of the visible-light frequency band and the infrared invisible-light frequency band and allowing the other of frequency band to pass through said lens element to be refracted thereby.

10. The telescopic day/night sight of claim 9 wherein said surface of said dual-function lens/mirror which carries said dichroic coating is concave to define a light-concentrating mirror surface for the reflected one of the visible-light frequency band and the infrared invisible-light frequency band.

11. The telescopic day/night sight of claim 8 wherein said sight further includes a dual-function refractive lens element disposed between said objective lens and said dichroic element, said dual-function refractive lens element first refracting the received light prior to this received light reaching said dual-function lens/mirror, and said dual function refractive lens element subsequently refracting the reflected one of visible-light frequency band and said infrared invisible-light frequency band.

12. The telescopic day/night sight of claim 8 wherein said dual-function lens/mirror is annular to define a central aperture.

13. The telescopic day/night sight of claim 12 wherein said dual-function lens/mirror central aperture defines a portion of one of said first optical path extending from said dichroic element to said eyepiece, and said second optical path optically coaxial with said first optical path and extending from said dichroic element to said means for receiving the infrared invisible light.

14. The telescopic day/night sight of claim 1 wherein said sight further includes a diffuser element disposed in said first optical path and receiving superimposed on one another both the visible-light image and the visible image replicating the scene.

15. The telescopic day/night sight of claim 14 wherein said diffuser element comprises a coherent optical fiber bundle in the form of a comparatively thin plate.

16. The telescopic day/night sight of claim 14 wherein said diffuser element comprises a plate-like holographic diffuser element.

17. The telescopic day/night sight of claim 14 wherein said diffuser element further comprises a reticle pattern visible through said eyepiece.

18. The telescopic day/night sight of claim 14 wherein said diffuser element disposed in said first optical path is angulated relative thereto and includes a reflective surface disposed toward said eyepiece and receiving the visible image replicating the scene for superimposing the visible image on the visible-light image.

19. A telescopic day/night sight comprising:
a single objective lens through which light from a scene to be viewed is received;
a dual-function dichroic lens/mirror element aft of said objective lens and both dividing the received light into a visible-light frequency band and an infrared invisible-light frequency band, as well as refracting one of the frequency bands of light;
a first optical path extending from said dichroic element to an eyepiece for providing a visible-light image of the scene to a user of said sight;
a second optical path extending from said dichroic element to said eyepiece for providing a visible image replicating said scene in response to said infrared invisible-light frequency band, said second optical path including means for receiving the invisible light and providing in response thereto a visible image replicating the scene.

20. The telescopic day/night sight of claim 19 wherein said dual-function dichroic lens/mirror element includes a refractive lens body having a non-planar surface carrying a dichroic reflective filter coating for dividing the received light into the visible-light frequency band and the infrared invisible-light frequency band.

21. The telescopic day/night sight of claim 20 wherein said surface of said dual-function dichroic lens/mirror element is concave.

22. The telescopic day/night sight of claim 21 wherein said dual-function dichroic lens/mirror element further includes another surface opposite said concave surface, and said another surface is convex.

23. The telescopic day/night sight of claim 22 wherein said dual-function dichroic lens/mirror element is optically a concentrating lens directing the one of said visible-light and invisible-light frequency bands which is refracted through said lens body toward the optical axis of said element.

24. The telescopic day/night sight of claim 19 wherein said sight further includes a dual-function refractive lens element disposed between said objective lens and said dual-function dichroic lens/mirror element, said dual-function refractive lens element first refracting the received light prior to this received light reaching said dual-function lens/mirror element, and said dual function refractive lens element subsequently further refracting the reflected one of visible-light frequency band and said infrared invisible-light frequency band.

25. The telescopic day/night sight of claim 24 wherein said dual-function lens/mirror element and said dual-function refractive lens element are both annular to define aligned respective central apertures.

26. The telescopic day/night sight of claim 25 wherein said aligned central apertures of said dual-function lens/mirror element and said dual-function refractive lens element cooperatively define a portion of one of said first optical path extending from said dichroic element to said eyepiece, and said second optical path optically coaxial with said first optical path and extending from said dichroic element to eyepiece via said means for receiving the invisible light and providing in response thereto a visible image replicating the scene.

27. The telescopic day/night sight of claim 19 wherein said dual-function dichroic lens element is annular and includes a refractive lens body which defines an outer refractive portion of said first optical path, and said annular dichroic lens element also defining a central aperture, said second optical path passing through said central aperture.

28. A hybrid electro-optical telescopic day/night sight comprising:
a single objective lens through which both visible and invisible light from a scene to be viewed is received, said objective lens defining an optical aperture of certain diameter, and both said visible and invisible light being received via the same diameter of said optical aperture;
a dual-function dichroic lens/mirror element aft of said objective lens, said dichroic lens/mirror element both reflectively dividing substantially all of the received visible and invisible light into a visible-light frequency band and into an infrared invisible-light frequency band, as well as refracting one of the visible-light and invisible-light frequency bands of light;
a first visible-light optical path extending from said dichroic element to an eyepiece for providing a received visible-light image of the scene to a user of said sight;
a second invisible-light hybrid electro-optical path extending from said dichroic element to said eyepiece for providing a visible image replicating the scene in response to receipt of the infrared invisible-light frequency band, said second optical path including electro-optical means for receiving the invisible infrared light and providing in response thereto an electronic image signal, image signal processing means for receiving the electronic image signal and selectively adding indicia thereto including an aiming reticle for said sight to provide a processed electronic image signal, and means for providing a visible image replicating the scene and including the added indicia in response to said processed electronic image signal.

29. The hybrid electro-optical telescopic day/night sight according to claim 28 further comprising said dual-function dichroic lens/mirror having an annular configuration to define a central aperture, said central aperture receiving said electro-optical means for receiving the invisible infrared light.

* * * * *